United States Patent
Van Dommele et al.

(10) Patent No.: US 12,377,574 B2
(45) Date of Patent: Aug. 5, 2025

(54) BOARDS FROM ACETYLATED RUBBERWOOD

(71) Applicant: TRICOYA TECHNOLOGIES LTD, London (GB)

(72) Inventors: Stefan Van Dommele, London (GB); Theodorus Gerardus Marinus Maria Kappen, Rosmalen (NL)

(73) Assignee: TRICOYA TECHNOLOGIES LTD, London (GB)

( * ) Notice: Subject to any disclaimer, the term of this patent is extended or adjusted under 35 U.S.C. 154(b) by 635 days.

(21) Appl. No.: 17/310,373

(22) PCT Filed: Feb. 3, 2020

(86) PCT No.: PCT/EP2020/052624
§ 371 (c)(1),
(2) Date: Jul. 29, 2021

(87) PCT Pub. No.: WO2020/157333
PCT Pub. Date: Aug. 6, 2020

(65) Prior Publication Data
US 2022/0118646 A1    Apr. 21, 2022

(30) Foreign Application Priority Data
Feb. 1, 2019    (EP) .................................... 19155107

(51) Int. Cl.
| | | |
|---|---|---|
| B27K 3/34 | (2006.01) |
| B27K 3/02 | (2006.01) |
| B27K 3/08 | (2006.01) |
| B27N 3/02 | (2006.01) |
| B27N 3/04 | (2006.01) |
| B27N 3/18 | (2006.01) |

(52) U.S. Cl.
CPC .............. *B27K 3/34* (2013.01); *B27K 3/0271* (2013.01); *B27K 3/08* (2013.01); *B27N 3/02* (2013.01); *B27N 3/04* (2013.01); *B27N 3/18* (2013.01); *B27K 2200/10* (2013.01); *B27K 2240/70* (2013.01)

(58) Field of Classification Search
None
See application file for complete search history.

(56) References Cited

U.S. PATENT DOCUMENTS

| | | |
|---|---|---|
| 3,403,145 A | 9/1968 | Edge et al. |
| 5,431,868 A | 7/1995 | Hirano |
| 5,525,721 A | 6/1996 | Ohshima et al. |
| 6,129,871 A | 10/2000 | Suzuki et al. |
| 6,376,582 B1 | 4/2002 | Iwata et al. |
| 6,723,766 B1 | 4/2004 | Hirano et al. |
| 2013/0298814 A1 | 11/2013 | Militz et al. |
| 2014/0227503 A1 | 8/2014 | Pol et al. |
| 2015/0051386 A1* | 2/2015 | Pol .......................... C08H 8/00 427/382 |
| 2016/0325460 A1* | 11/2016 | Gudsell ................... C08L 91/00 |
| 2018/0079104 A1 | 3/2018 | Benstead et al. |

FOREIGN PATENT DOCUMENTS

| | | |
|---|---|---|
| DE | 102010050788 A1 | 5/2012 |
| DE | 102016122762 A1 | 5/2018 |
| EP | 2623281 A1 | 8/2013 |
| JP | H0183505 U | 6/1989 |
| JP | 2000351106 A | 12/2000 |
| WO | 2009095687 A1 | 8/2009 |
| WO | 2011095824 A1 | 8/2011 |
| WO | 2012037481 A1 | 3/2012 |
| WO | 2013117641 A1 | 8/2013 |
| WO | 2013139937 A2 | 9/2013 |
| WO | 2013139937 A3 | 11/2013 |
| WO | 2016008995 A2 | 1/2016 |

OTHER PUBLICATIONS

International Preliminary Report on Patentability dated May 17, 2021 from PCT Application No. PCT/EP2020/052624.
International Search Report & Written Opinion dated May 7, 2020 from PCT Application No. PCT/EP2020/052624.
N. Ayrilmis, et al., "Effects of Thermal Treatment of Rubberwood Fibres on Physical and Mechanical Properties of Medium Density Fibreboard", Journal of Tropical Forest Science 23(1): 10-16 (2011).
Rathke, Jorn, et al., Strain Measurements within Fiber Boards. Part I: Inhomogeneous Strain Distribution within Medium Density Fiberboards (MDF) Loaded Perpendicularly to the Plane of the Board, Materials 2012, 5, 1115-1124.
Y. Tomimura et al., "Chemical Modification of Rubberwood for Medium Density Fibreboard", Journal of Tropical Forest Science, vol. 1, No. 4 (Jun. 1989), pp. 312-317 (6 pages)Published By: Forest Research Institute Malaysia.

* cited by examiner

*Primary Examiner* — Chinessa T. Golden
(74) *Attorney, Agent, or Firm* — INNOVATION CAPITAL LAW GROUP, LLP; Vic Lin

(57) ABSTRACT

Disclosed is a board made from acetylated rubberwood elements and a method for making same. The acetylated rubberwood elements have an acetyl content of at least 17% and/or are prepared by acetylating rubberwood elements using an acetylation agent in the vapour phase. The invention also pertains to acetylated rubberwood elements prepared by using an acetylation agent in the vapour phase.

12 Claims, No Drawings

BOARDS FROM ACETYLATED RUBBERWOOD

FIELD OF THE INVENTION

The invention disclosed herein relates to boards comprising acetylated rubberwood elements, a method of making same, and to acetylated rubberwood elements.

BACKGROUND

Boards, e.g. MDF (medium density fibre board), refers to a composite product comprising wood elements pressed and glued together with an adhesive, typically a phenol-formaldehyde or urea-formaldehyde resin, or a polymeric diphenylmethane diisocyanate adhesive. Frequently, boards such as MDF panels also comprise a wax. Boards, such as MDF, are commonly manufactured in various thicknesses (typically from 3 mm to 25 mm) and densities, and may be supplied with a visually-attractive paper- or wood-veneer or plastics surface finish or surface coating. It is a stiff, very rigid, practically inflexible material. This is normally advantageous, since also relatively thin panels at the low end of the aforementioned thickness range—the most typical thicknesses therein being 6 and 9 mm—are highly suitable for use in applications where rigidity is desired. Thus, the panels find wide end use application for example in furniture, decorative interior wall lining, doors, separation walls, and many other typically indoor applications where it is desired to employ panels of good rigidity.

Wood fibreboards come generally in thicknesses ranging from 2 mm to 60 mm and densities ranging from 600-1000 kg/m$^3$. MDF in a strict sense, which is what the invention preferably pertains to, has a density in the range of from 650 kg/m$^3$ to 800 kg/m$^3$. Above 800 kg/m$^3$ it is normally spoken of high-density fibreboard (HDF). Below 650 kg/m$^3$ it is spoken of light MDF, or ultra light MDF (<550 kg/m$^3$).

An important characteristic of wood fibreboard, and thus also of MDF, is the size of the wood elements used. In this respect different classes of product can be distinguished, each having their own particular fields of use. Thus, wood fibreboard is a different product than, e.g., wood particle board. The latter has larger wood particles, generally having a length of 1.5 to 15 mm, a width of 0.15 mm to 1.30 mm, and a thickness of 0.15 to 1.25 mm. The fibres in fibreboard, such as MDF, are considerably smaller, typically having a length of 7 mm or below, preferably of from 1 mm to 5 mm, a width of 0.05 mm to 0.1 mm, and a thickness also of 0.05 mm to 0.1 mm.

The wood elements in wood boards can originate from basically any fibrous lignocellulosic material, with typically used wood being spruce (genus *picea*), various types of pine (genus *pinus*), or eucalyptus (genus: *eucalyptus*). The invention relates to boards comprising wood elements originating from rubberwood (*Hevea brasiliensis*).

Just as with other engineered wood products, such as particle board or oriented strand board, fibreboard can also be made of modified wood (e.g. steam-treated wood or acetylated wood). Acetylation of wood is commonly used to increase the sustainability of the wood.

In addition, most boards, in particular MDF boards, preferably have good mechanical properties, such as a high internal bond strength. The internal bond strength is defined as "the ultimate failure stress of a wood composite panel under tensile load perpendicular to the board plane." (J. Rathke et al., Materials, 2012, volume 5, pages 1115-1124).

In this context, it is known in the art that strand boards are constructed differently than other boards, and typically have other mechanical properties than other boards, in particular MDF boards. For example, for strand boards good mechanical properties are determined by the oriented strands in multiple directions, as a result of which limited deflection and warping is obtained. These properties differ from the internal bond strength, which is a tensile strength. As compared to strand boards, in other boards, particularly MDF, good mechanical properties are determined mostly by the internal bond strength.

In the art, it is a known problem that boards, especially MDF, made from acetylated rubberwood in general have worse mechanical properties, such as internal bond strength, than boards made from non-acetylated rubberwood.

In particular, Tomimura et al. (Journal of Tropical Forest Science, 1989, volume 1, pages 312-317) reported that the internal bond strength of MDF made from acetylated rubberwood was severely lower than that of MDF made from non-acetylated rubberwood. Therein, acetylated rubberwood fibres with a weight percentage gain of 15.4% were used. The acetylated rubberwood fibres were prepared by placing the fibres in an Erlenmeyer flask, adding a mixture of acetic anhydride-pyridine (10:1, w/w). Then, the flask was placed in a water bath at 60° C. for 12 h, after which the fibres were washed with water.

Background art related to internal bond strength of MDF comprising acetylated rubberwood fibers includes a paper by Ayrilmis et al. (J. Trop. For. Sci. 2011, volume 23, pages 10-16). Therein, the internal bond strength of rubberwood MDF panels is investigated, wherein the rubberwood fibres are subjected to heat treatment. According to Ayrilmis et al., the internal bond strength is reduced for MDF panels comprising heat-treated fibres (i.e. more hydrophobic fibres) as compared to MDF prepared with untreated rubberwood fibres. Without wishing to be bound by theory, it is asserted by Ayrilmis et al. that the increase of hydrophobicity due to heat treatment causes a reduction of the adhesion and penetration of the adhesive during preparation of the MDF panels.

Other preferred properties of boards, especially MDF boards, include, but are not limited to, a good dimensional stability, a desired durability, and ease of preparation.

It is desired that boards made from acetylated rubberwood elements having suitable properties, and methods for making same, be provided. Preferably, these boards, in particular MDF boards, have better mechanical properties, preferably a higher internal bond strength, as compared to known boards made from acetylated rubberwood elements. In addition, it is desired that acetylated rubberwood elements, in particular acetylated rubberwood fibres, are provided that can be used to prepare boards having suitable properties, in particular better mechanical properties, preferably a higher internal bond strength, as compared to known boards made from acetylated rubberwood elements.

SUMMARY OF THE INVENTION

In one aspect, the present invention pertains to a board comprising acetylated wood elements, wherein the acetylated wood elements are obtained from rubberwood, wherein said acetylated wood elements have an acetyl content of at least 17%, and wherein said acetylated wood elements are selected from the group consisting of fibres, chips, particles, splinters, and fibre bundles; preferably fibres.

In another aspect, the invention relates to a board comprising acetylated wood elements, wherein the acetylated wood elements are obtained from rubberwood, and wherein said acetylated wood elements are obtainable by a method comprising the subsequent steps of:
  a) Providing wood elements from rubberwood; and
    b) Contacting said wood elements with an acetylation agent; wherein the acetylation agent is in the vapour phase, and wherein said acetylated wood elements are selected from the group consisting of fibres, chips, particles, splinters, and fibre bundles; preferably fibres.

In yet another aspect, the invention pertains to acetylated wood elements, wherein the acetylated wood elements are rubberwood, wherein the acetylated wood elements are obtainable by a method comprising the subsequent steps of:
  a) Providing wood elements from rubberwood; and
    b) Contacting said wood elements with an acetylation agent, wherein the acetylation agent is in the vapour phase, and wherein said acetylated wood elements are selected from the group consisting of fibres, chips, particles, splinters, and fibre bundles; preferably fibres.

In a further aspect still, the invention relates to a method for producing acetylated rubberwood elements, wherein the method comprises the subsequent steps of:
  a) Providing wood elements from rubberwood, wherein said wood elements are selected from the group consisting of fibres, chips, particles, splinters, and fibre bundles; preferably fibres; and
  b) Contacting said wood elements with an acetylation agent; wherein the acetylation agent is in the vapour phase.

In still a further aspect, the invention pertains to a method for producing acetylated rubberwood elements, wherein the method comprises the subsequent steps of:
  a) Providing wood elements from rubberwood, wherein said wood elements are selected from the group consisting of fibres, particles, splinters, and fibre bundles; preferably fibres; and
  b) Contacting said wood elements with an acetylation agent to obtain acetylated rubberwood elements having an acetyl content of at least 17%, wherein preferably the acetylation agent is in the vapour phase.

In yet a further aspect, the invention pertains to a method for producing boards according to the invention, wherein the method comprises the subsequent steps of:
  a) providing acetylated wood elements according to the invention, and an adhesive; and
  b) forming a board.

DETAILED DESCRIPTION OF THE INVENTION

The invention, in a broad sense, is based on the judicious insight that at least one of the abovementioned desires is met by providing boards comprising acetylated rubberwood elements, which have an acetyl content of at least 17%.

In addition, the inventors surprisingly found that at least one of the abovementioned desires is met by providing boards comprising acetylated rubberwood elements, which are obtainable by a method comprising the subsequent steps of:
  a) Providing wood elements from rubberwood, and said acetylated wood elements are selected from the group consisting of fibres, chips, particles, splinters, and fibre bundles; preferably fibres; and
  b) Contacting said wood elements with an acetylation agent, wherein the acetylation agent is in the vapour phase.

This is surprising, as acetylation increases the hydrophobicity of the wood. Nevertheless, the inventors have found that boards according to the invention, in particular MDF boards, better address at least one of the abovementioned desires. In general, they display improved mechanical properties, more particularly an increased internal bond strength, as compared to boards that do not comprise acetylated wood fibers.

In preferred embodiments, the boards of the invention comprise acetylated wood elements, wherein the acetylated wood elements are obtained from rubberwood, wherein the acetylated wood elements have an acetyl content of at least 8%, preferably at least 17%, wherein said acetylated wood elements are obtainable by a method comprising the subsequent steps of:
  a) Providing wood elements from rubberwood; and
  b) Contacting said wood elements with an acetylation agent, wherein the acetylation agent is in the vapour phase.

In a preferred embodiment, the board according to the invention comprises acetylated rubberwood elements as defined herein in an amount of at least 50% by weight, preferably at least 65% by weight, more preferably at least 80% by weight, even more preferably at least 90% by weight, more preferably still at least 95% by weight, most preferably at least 99% by weight, as compared to the total weight of wood elements comprised in the board. The remaining amount of wood elements may comprise non-acetylated rubberwood elements. Optionally, the remaining amount of wood elements comprises acetylated and/or non-acetylated wood elements, which are preferably made of wood selected from the group consisting of spruce, sitka spruce, maritime pine, scots pine, radiata pine, *eucalyptus*, red alder, European alder, beech, birch, loblolly pine, lodgepole pine, pitch pine, red pine, Southern yellow pine, Japanese cedar (sugi), hemlock, palm, Paulownia, teak, maple, oak, white oak, and combinations thereof.

Most preferably, essentially all of the wood elements comprised in the board according to the invention are acetylated rubberwood elements as defined herein. In another preferred embodiment, all of the wood elements comprised in the board according to the invention are acetylated rubberwood elements as defined herein.

In a preferred embodiment, the board according to the invention comprises acetylated rubberwood elements having an acetyl content of at least 17%, more preferably of at least 17.5%, even more preferably of at least 18%, even more preferably of at least 19%, more preferably still of at least 20%, and most preferably of at least 21%. In another preferred embodiment, the board according to the invention comprises acetylated rubberwood elements having an acetyl content of greater than 21%, more preferably greater than 22%.

In a preferred embodiment, the board according to the invention comprises acetylated rubberwood elements having an acetyl content of at most 35%. More preferably, the board according to the invention comprises acetylated rubberwood elements having an acetyl content of at most 32%, even more preferably of at most 30%, more preferably still of at most 27%, and most preferably of at most 25%.

In a preferred embodiment, the board according to the invention comprises acetylated rubberwood elements having an acetyl content of in a range of from 17% to 35%, more preferably in a range of from 18% to 32%, even more preferably in a range of from 19% to 30%, more preferably still in a range of from 20% to 27%, and most preferably in a range of from 21% to 25%. In another preferred embodiment, the board according to the invention comprises acetylated rubberwood elements having an acetyl content of in a range of from 22% to 23%.

In a preferred embodiment, the board according to the invention is selected from the group consisting of medium density fibre board, low density fibre board, high density fibreboard, particleboard, and flakeboard. Most preferably, the board according to the invention is a medium density fibre board.

In a preferred embodiment, the board according to the invention is selected from the group consisting of medium density fibre board, and high density fibreboard; wherein said medium density fibre board or high density fibre board comprises acetylated rubberwood elements having an acetyl content of at least 14%, preferably of at least 15%, more preferably of at least 16%, most preferably of at least 17%.

In a preferred embodiment, the board according to the invention is selected from the group consisting of medium density fibre board, high density fibreboard, and flakeboard; wherein said medium density fibre board, high density fibre board, or flakeboard comprises acetylated wood elements having an acetyl content of at least 16%, preferably of at least 17%.

The board according to the invention comprises acetylated wood elements selected from the group consisting of fibres, chips, particles, splinters, and fibre bundles.

Most preferably, the board according to the invention comprises acetylated wood elements, wherein the acetylated wood elements are fibres or fibre bundles, preferably fibres. Preferably, essentially all of the acetylated wood elements comprised in the board of the invention are fibres or fibre bundles, most preferably fibres. More preferably, all of the acetylated wood elements comprised in the board of the invention are fibres or fibre bundles, most preferably fibres. In a preferred embodiment, the board according to the invention comprises acetylated wood elements, wherein the acetylated wood elements are fibres, and wherein the board is a medium density fibre board.

In another preferred embodiment, the board according to the invention comprises acetylated wood elements, wherein the acetylated wood elements are particles. Preferably, essentially all of the acetylated wood elements comprised in the board of the invention are particles. More preferably, all of the acetylated wood elements comprised in the board of the invention are particles. In a preferred embodiment, the board according to the invention comprises acetylated wood elements, wherein the acetylated wood elements are particles, and wherein the board is a particle board.

The invention also pertains to acetylated wood elements, wherein the acetylated wood elements are rubberwood, wherein the acetylated wood elements are obtainable by a method comprising the subsequent steps of:
 a) Providing wood elements from rubberwood; and
 b) Contacting said wood elements with an acetylation agent, wherein the acetylation agent is in the vapour phase.

Acetylation of wood elements wherein the acetylation agent is in the vapour phase is further described below. Without wishing to be bound by theory, the inventors believe that acetylation in the liquid phase will leach more of the resins (of which rubberwood typically contains a significant amount) than acetylation in the vapour phase. Therefore, it is believed that rubberwood acetylated from the vapour phase contains more of the original resin content as compared to rubberwood acetylated in the liquid phase.

Typical dimensions of wood elements as defined in accordance with the present invention are given in Table 1.

TABLE 1

| Wood element | length (mm) from | to | width (mm) from | to | thickness (mm) from | to |
| --- | --- | --- | --- | --- | --- | --- |
| Chips | 5 | 75 | 5 | 50 | 1.5 | 25 |
| Strands | 20 | 120 | 5 | 40 | 0.25 | 1.5 |
| splinters (slivers) | 5 | 75 | 0.15 | 0.5 | 0.15 | 0.5 |
| Particles | 1.5 | 20 | 0.15 | 5 | 0.15 | 5 |
| Fibre bundles | 1.5 | 25 | 0.15 | 0.5 | 0.15 | 0.5 |
| Fibres | 1 | 5 | 0.05 | 0.1 | 0.05 | 0.1 |

In some embodiments, the wood elements have a length 1.0-75 mm, a width of 0.05-50 mm and a thickness of 0.05-25 mm.

In relation to the invention, the term "wood elements" is understood to not comprise solid wood. Wood elements in relation to the invention typically have a length in a range of from 1 mm to 120 mm, a width in a range of from 0.05 mm to 50 mm, and a thickness in a range of from 0.05 mm to 25 mm.

In a preferred embodiment, the acetylated wood elements of the invention are wood chips, wood particles or wood fibres. Preferably, the acetylated wood elements of the invention are wood particles. Most preferably, the acetylated wood elements of the invention are wood fibres.

It will be understood that the acetylated rubberwood elements of the invention can be obtained in several ways. For example, solid rubberwood may be acetylated as described herein, and then chipped so as to obtain acetylated rubberwood chips, which may then be refined so as to obtain acetylated rubberwood fibers. Alternatively, solid rubberwood may first be chipped so as to obtain rubberwood chips. Then, these rubberwood chips may be acetylated as described herein, and refined to form acetylated rubberwood fibres. As another alternative, the rubberwood chips are refined to form rubberwood fibres, after which the rubberwood fibres are acetylated as described herein.

Therefore, the acetylated rubberwood fibres of the invention are obtainable by acetylation of rubberwood fibres, or by refining acetylated rubberwood chips.

In a preferred embodiment, the acetylated rubberwood elements according to the invention, preferably acetylated rubberwood fibres, have an acetyl content of at least 8%, more preferably of at least 10%, more preferably still of at least 12%, yet more preferably at least 14%, even more preferably still at least 15%, even more preferably at least 16%, at least 17%, at least 18%, at least 19%, or at least 20%, and most preferably of at least 21%. In another preferred embodiment, the acetylated rubberwood elements according to the invention, preferably acetylated rubberwood fibres, have an acetyl content of greater than 21%, such as at least 22%.

In a preferred embodiment, the acetylated rubberwood elements according to the invention, preferably acetylated rubberwood fibres, have an acetyl content of at most 35%. More preferably, the acetylated rubberwood elements according to the invention have an acetyl content of at most 32%, even more preferably of at most 30%, more preferably still of at most 27%, and most preferably of at most 25%.

In a preferred embodiment, the acetylated rubberwood elements according to the invention, preferably acetylated rubberwood fibres, have an acetyl content of in a range of from 8% to 35%, more preferably in a range of from 12% to 32%, even more preferably in a range of from 14% to 30%, more preferably still in a range of from 16% to 27%, and most preferably in a range of from 17% to 25%. In another preferred embodiment, the acetylated rubberwood elements according to the invention, preferably acetylated rubberwood fibres, have an acetyl content in a range of from 22% to 23%.

Acetylation of wood elements according to the invention is generally conducted in accordance with optimized acetylation processes as are known in the field. These processes typically make use of acetylation agents in the liquid phase or in a vapour phase.

Preferably, the boards of the invention comprise wood elements acetylated by using an acetylation agent in the vapour phase. Suitable processes for acetylating wood elements using an acetylation agent in the vapour phase are described in U.S. Pat. Nos. 3,403,145, 5,431,868, 5,525,721, 6,376,582, which are herein incorporated by reference. Typical acetylation agents for use in these processes are acetic anhydride, acetic acid, acetyl chloride, ketene, and mixtures thereof; of which acetic anhydride is preferred. The initial acetylation fluid preferably has a composition as described herein.

In a preferred embodiment, the rubberwood elements are dried, preferably in an oven, prior to impregnation. Preferably, drying is carried out at a temperature in a range of from 80° C. to 130° C., more preferably in a range of from 90° C. to 115° C. Preferably, drying of rubberwood elements is carried out for a duration of at least 30 minutes, more preferably of at least 1 hour. It will be understood that the required drying time may depend on the dimensions of the wood element that needs to be dried. Preferably, for solid rubberwood drying is carried out for a duration in a range of from 8 hours to 25 hours, more preferably in a range of from 12 to 20 hours. For rubberwood chips or rubberwood fibres, drying is preferably carried out for a duration in a range of from 30 minutes to 4 hours, more preferably in a range of from 1 hour to 3 hours.

In preferred embodiments, the rubberwood elements are impregnated as described herein prior to the acetylation reaction.

Preferably, rubberwood elements are acetylated in the vapour phase at a temperature in the range of from 150° C. to 220° C., more preferably in a range of from 180° C. to 205° C. In preferred embodiments, the rubberwood elements are acetylated in the vapour phase at a pressure in a range of from 0 to 6 barg, preferably in a range of from 1.5 to 4 barg. In preferred embodiments, the rubberwood elements are acetylated in the vapour phase at atmospheric pressure. Preferably, the rubberwood elements are acetylated in the vapour phase for a duration in a range of from 10 minutes to 90 minutes, more preferably in a range of from 15 to 60 minutes.

Preferably, after the acetylation reaction, the reaction vessel containing the acetylated rubberwood elements are brought back to ambient conditions. In preferred embodiments, the acetylated rubberwood elements are then subjected to a chemical recovery step at a temperature in a range of from 130° C. to 220° C., preferably in a range of from 150° C. to 200° C. Preferably, the chemical recovery step is performed for a duration in a range of from 20 minutes to 90 minutes, more preferably in a range of from 30 minutes to 60 minutes.

Preferred processes for acetylation using acetylation agents in a liquid phase comprise the following steps:

Providing wood elements;
    Controlling, and if necessary adjusting, the moisture content of the wood elements;
    Impregnating the wood elements with acetylation fluid;
    Subjecting the impregnated wood elements to one or more heating steps in order to effectuate acetylation of the wood elements; and
    Separating the acetylated wood elements from excess acetylation fluid.

The acetylated wood elements so obtained can be either processed further directly (e.g., in the event that the making of boards according to the invention, in particular MDF boards, comprising acetylated wood elements is conducted in-line with the acetylation process), or they can be worked-up (such as by drying, or cooling) for storage and/or transport.

Before acetylation, the wood elements are typically subjected to a step allowing the moisture content of the wood elements to be controlled. This can be done in a continuous or batch process by any method known in the wood industry. Generally, a desirable moisture content before acetylation is less than 15% by weight. Preferably, the moisture content of the wood is brought to a value of less than 8%, more preferably in a range of from 0.01% to 5%, and most preferably in a range of from 0.5% to 4%.

The acetylation process itself can be conducted, as known in the art, using liquid and/or gaseous acetylation fluid. Typical acetylation agents are acetic anhydride, acetic acid, acetyl chloride, ketene, and mixtures thereof. Acetic anhydride is preferred as the acetylation agent. Preferably the initial acetylation fluid used comprises acetic anhydride.

In a preferred embodiment, the initial acetylation fluid comprises acetic anhydride in an amount in a range of from 70 wt % to 99 wt %, more preferably in a range of from 80 wt % to 95 wt %, wherein the weight percentage (wt %) is as compared to the total weight of the initial acetylation fluid. In another preferred embodiment, the initial acetylation fluid comprises acetic acid in an amount in a range of from 1 wt % to 30 wt %, more preferably in a range of from 3 wt % to 15 wt %, wherein the weight percentage (wt %) is as compared to the total weight of the initial acetylation fluid.

In a particularly preferred embodiment, the initial acetylation fluid comprises acetic anhydride and acetic acid. More preferably, the initial acetylation fluid comprises acetic anhydride in an amount in a range of from 70 wt % to 99 wt %, preferably in a range of from 80 wt % to 95 wt %, and acetic acid in an amount in a range of from 1 wt % to 30 wt %, more preferably in a range of from 3 wt % to 15 wt %, wherein the weight percentage (wt %) is as compared to the total weight of the initial acetylation fluid.

It will be understood that as a result of the acetylation reaction, the composition of the acetylation fluid will change during the process, since the acetylating agent is consumed, and reaction products, e.g. acetic acid, are thereby formed. Typically, contacting of the wood elements with acetylation fluid, comprises an impregnation step (such as with acetic anhydride).

In an interesting embodiment, the impregnation step comprises a Bethel type impregnation process. Therein, the wood elements to be subjected to impregnation are placed in a vacuum chamber and vacuum is applied to draw air and/or other gases (e.g. $N_2$) from the wood. The impregnation fluid (e.g. comprising acetic anhydride) is then added to the chamber under vacuum. After filling the chamber with liquid a pressure generally up to 250 pounds per square inch (psi) can be applied, preferably 150 psi to 200 psi. The pressure is removed so that the wood is again subject to atmospheric pressure. This type of process is regularly preferred, since it should normally result in a maximum impregnation load, which is believed to have a direct relation to a desired maximum acetyl level. The impregnation fluid is allowed to stay in contact with the wood elements, under the acetylation reaction conditions (typically in an autoclave) for a duration of generally 1 to 10 hours, more preferably 2 to 8 hours, even more preferably 4 to 6 hours, and most preferably for about 5 hours.

However, in the event that maximum acetylation fluid uptake after impregnation is not a primary goal, more economical impregnation processes can also be used. Examples thereof, known to the person skilled in the art of wood impregnation, are the so-called Lowry and Rueping processes. These processes require no initial vacuum. Instead, the impregnation fluid is forced deep into the wood under pressure. The compressed gas inside the wood then expands when the pressure is released, causing any excess preservative to be forced out of the wood.

In interesting embodiments, the acetylation is conducted in accordance with any one of the acetylation processes as described in WO2009/095687, WO2011/95824, WO2012/037481, WO2013/117641, WO2013/139937, or WO2016/008995, the disclosures of which are herein incorporated by reference. E.g., a preferred process for obtaining high acetyl contents is a three-stage process as described in WO2016/008995. Acetylation reactions in the liquid phase are preferably conducted at temperatures in a range of from 120° C. to 200° C., more preferably in a range of from 160° C. to 180° C. The skilled person will be able, for a given reactor equipment and depending on the wood species to be acetylated, to optimize the time and temperature conditions chosen.

It should be noted that in determining wood acetylation degrees, two different approaches exist in the field. One is based on WPG (Weight Percentage Gain). WPG compares a sample (of wood after extraction) before and after acetylation treatment, and as a result any substances added (and any residues still present in the wood) increase the value. WPG is explained in the following formula: $WPG=(M_{increase}/M_{sample\ before\ reaction})\times 100\%$. Herein M stands for mass, and $M_{increase}=M_{sample\ after\ reaction}-M_{sample\ before\ reaction}$. Herein, it will be understood that with "reaction" the acetylation reaction is meant.

The other approach, is to actually measure the acetyl content (AC). This is given as $AC=(M_{acetyls}/M_{sample\ after\ reaction})\times 100\%$. Typically HPLC (high-pressure liquid chromatography) can be used to quantify the acetate ion concentrations resulting from the saponification of acetyl groups from the wood. From this the overall mass of the acetyl groups after acetylation can be taken as $M_{acetyls}$. In relation herewith, it will be understood that with "sample after reaction" the sample is meant that is obtained after the acetylation reaction, but prior to the saponification reaction.

A preferred way to determine the $M_{acetyls}$ is as follows. Wood samples M are ground to wood particles. From these samples residual trace amounts of acetic acid and/or acetic anhydride are removed, by washing with water and subsequent drying at 103±2° C. for between 14-24 hrs. After weighing these dried samples the acetyl groups are released from the wood in the form of acetate ions by saponification with sodium hydroxide solution at elevated temperature. This saponification reaction runs for 4 hrs, with stirring every 15 minutes. The acetate ions are quantified by means of high-pressure liquid chromatography (HPLC), after calibrating this HPLC with standard acetate solutions and using sodium butyrate as internal reference. Thus, the $M_{acetyls}$ is obtained.

It will be understood that $M_{sample\ after\ reaction}$ can be determined by simply weighing the sample.

The different results for WPG and AC can be explained with reference to the following theoretical example: a sample of, e.g., 1 g of wood is acetylated and after the reaction has a mass of 1.25 g. Thus $M_{acetyls}$ is 0.25 g. The resulting WPG is: $(1.25-1.00)/1.00*100\%=25\%$. Calculated as acetyl content, AC is $=(1.25-1.00)/1.25*100\%=20\%$.

Hence, care should be taken not to directly compare degrees of acetylation expressed in WPG with degrees of acetylation expressed in AC. In the present description AC values are elected to identify the degree of acetylation.

In relation hereto, it will be understood that measuring the acetyl content of wood elements comprised in a board is performed by grinding at least part of the board, and e.g. using the abovementioned characterization using saponification and HPLC.

In a further aspect, the invention relates to a method for producing acetylated rubberwood elements according to the invention, wherein the method comprises the subsequent steps of:
a) Providing wood elements from rubberwood, wherein said wood elements are selected from the group consisting of fibres, chips, particles, splinters, and fibre bundles; preferably fibres; and
b) Contacting said wood elements with an acetylation agent; wherein the acetylation agent is in the vapour phase.

In a further aspect, the invention relates to a method for producing acetylated rubberwood elements according to the invention, wherein the method comprises the subsequent steps of:
a) Providing wood elements from rubberwood, wherein said wood elements are selected from the group consisting of fibres, particles, splinters, and fibre bundles; preferably fibres; and
b) Contacting said wood elements with an acetylation agent to obtain acetylated rubberwood elements having an acetyl content of at least 17%, wherein preferably the acetylation agent is in the vapour phase.

In a preferred embodiment, the invention relates to a method for producing acetylated rubberwood elements according to the invention, wherein the method comprises the subsequent steps of:
a) Providing wood elements from rubberwood, wherein said wood elements are chips; and
b) Contacting said wood elements with an acetylation agent to obtain acetylated rubberwood elements having an acetyl content of at least 17%, wherein preferably the acetylation agent is in the vapour phase;
c) refining said acetylated rubberwood elements to obtain fibres.

In a further aspect, the invention pertains to a method for producing boards according to the invention, wherein the method comprises the subsequent steps of:
a) providing acetylated wood elements according to the invention, and an adhesive; and
b) forming a board.

In a preferred embodiment, in the method for producing boards, preferably MDF boards, according to the invention the acetylated wood elements have a moisture content in a range of from 4 wt % to 8 wt % as compared to the total weight of the acetylated wood elements. More preferably, the moisture content of the acetylated wood elements is in a range of from 5 wt % to 7 wt %, even more preferably in a range of from 5.5 wt % to 6.5 wt %. Most preferably, the moisture content of the acetylated wood elements is about 6 wt %. It will be understood that this moisture content refers to the moisture content directly prior to preparing the board.

The method for producing medium density fibre boards according to the invention will generally be the same as conventionally used in making traditional MDF. The composition of the MDF board of the invention will generally be, in percentages by weight, 75-92% wood, 2-15% adhesive (glue), 0-2.5% additives, preferably 0.5-2.5% additives, and 4-10% water.

The adhesive can generally be selected from the same types of adhesives as are used in making conventional MDF. Preferred adhesives are selected from the group consisting of phenol-formaldehyde resin, melamine urea-formaldehyde resin, or isocyanate based adhesives among which methylene diphenyl diisocyanate (MDI) and polymeric methylene diphenyl diisocyanate (PMDI). Most preferably, MDI-based adhesives are used.

Additives are optional. They are used in small amounts, and for different purposes. The most widely used additive is wax, preferably paraffin, which is added either as a wax melt or in the form of an aqueous emulsion. Paraffin, or other waxes, are mainly added to improve the swelling properties of the MDF.

In a preferred embodiment, the MDF boards of the invention are made in a process comprising the following steps:
a) providing acetylated rubberwood fibres as defined herein;
b) contacting said acetylated rubberwood fibres with an adhesive and, preferably, an additive, preferably a wax;
c) drying;
d) casting the fibres onto a surface, so as to form a mat;
e) cold pre-pressing;
f) hot pressing;
g) finishing and cutting to size;
h) sanding.

In commercial, continuous processing, the surface on which the fibres are cast will generally be a moving belt, with also the further steps, including the pressing being conducted via a moving belt, e.g. via a double belt press or a calendar. It is conceivable, though, that the mat is provided on a continuously moving belt, and the pressing is conducted in a multidaylight press.

The MDF boards comprising acetylated wood fibres of the invention can be made in accordance with, e.g., the following general processes:
(a) chipping solid rubberwood; acetylating the chips; refining the acetylated wood so as to form acetylated wood fibres; rendering the fibres into an MDF panel as described above; or
(b) chipping solid rubberwood, refining so as to form wood fibres; acetylating the wood fibres; rendering the fibres into an MDF panel as described above.

A reference which provides background on particle board, oriented strand board, and fibreboard made on the basis of acetylated wood, is WO 2011/095824.

Preferably, the board, in particular an MDF board, of the invention has an internal bond strength of at least 0.8 N/mm$^2$, preferably at least 1.0 N/mm$^2$, more preferably at least 1.2 N/mm$^2$, most preferably at least 1.5 N/mm$^2$.

It will be understood that all embodiments as defined herein may be combined to describe further embodiments. When herein is referred to "the invention", this is understood to be a reference to the invention in all its embodiments.

Some of the embodiments are Embodiments 1-15 as listed below.

Embodiment 1. A board comprising acetylated wood elements, wherein the acetylated wood elements are obtained from rubberwood, and wherein said acetylated wood elements have an acetyl content of at least 17%.

Embodiment 2. A board comprising acetylated wood elements, wherein the acetylated wood elements are obtained from rubberwood, and wherein said acetylated wood elements are obtainable by a method comprising the subsequent steps of:
a) Providing wood elements from rubberwood; and
b) Contacting said wood elements with an acetylation agent; wherein the acetylation agent is in the vapour phase.

Embodiment 3. The board according to any one of the previous Embodiments, wherein the acetylated wood elements are present in an amount of at least 50% by weight, preferably at least 80% by weight, as compared to the total weight of wood elements comprised in the board.

Embodiment 4. The board according to any one of the previous Embodiments, wherein the acetylated wood elements have an acetyl content of at most 35%.

Embodiment 5. The board according to any one of the previous Embodiments, wherein the board is selected from the group consisting of medium density fibre board, low density fibre board, high density fibreboard, particleboard, and flakeboard; preferably medium density fibre board.

Embodiment 6. The board according to any one of the previous Embodiments, wherein the acetylated wood elements are selected from the group consisting of fibres, chips, strands, particles, splinters, and fibre bundles; preferably fibres.

Embodiment 7. The board according to any one of the Embodiments 2 to 6, wherein the acetylated wood elements have an acetyl content of at least 8%, preferably of at least 17%.

Embodiment 8. Acetylated wood elements, wherein the acetylated wood elements are rubberwood, wherein the acetylated wood elements are obtainable by a method comprising the subsequent steps of:
a) Providing wood elements from rubberwood; and
b) Contacting said wood elements with an acetylation agent, wherein the acetylation agent is in the vapour phase.

Embodiment 9. Acetylated wood elements according to Embodiment 8, wherein the acetylation agent is selected from the group consisting of acetic anhydride, acetic acid, ketene, acetyl chloride, and combinations thereof.

Embodiment 10. Acetylated wood elements according to any one of Embodiments 8 and 9, wherein the acetylated wood elements have an acetyl content of at least 8%, preferably at least 17%, and preferably an acetyl content of at most 35%.

Embodiment 11. Acetylated wood elements according to any one of Embodiments 8 to 10, wherein the wood elements are wood fibres.

Embodiment 12. Acetylated wood elements according to any one of Embodiments 8 to 10, wherein the wood elements are wood chips.

Embodiment 13. Acetylated wood elements, wherein the wood elements are fibres obtained by refining the wood chips according to Embodiment 12.

Embodiment 14. A method for producing the board according to any one of Embodiments 1 to 7, wherein the method comprises the subsequent steps of:

a) providing acetylated wood elements according to any one of Embodiments 8 to 13, and an adhesive; and
b) forming a board.

Embodiment 15. The method of Embodiment 14, wherein the acetylated wood elements have a moisture content in a range of from 4 wt % to 8 wt % as compared to the total weight of the acetylated wood fibres.

The invention is hereinafter illustrated with reference to the following, non-limiting, examples.

EXAMPLES

Example 1: Acetylating Wood Elements Made Of Rubberwood

Example 1.1 Acetylation in the Vapour Phase At Atmospheric Pressure

Rubberwood chips were dried in an oven at 105° C. for 16 h. The chips were then impregnated with the acetylating reagent using the method according to Bethel. The acetylating agent was a mixture of 10 vol % acetic acid and 90 vol % acetic anhydride, wherein the vol % is as compared to the total volume of the acetylating agent. After the impregnation, the excess liquid was removed and the impregnated rubberwood chips were transferred to a reaction vessel. Acetylation was performed at a temperature between 150° C. and 170° C. at atmospheric conditions in a timeframe of from 30 minutes to 120 minutes. The chips were then allowed to cool down before being analyzed. Acetylated rubberwood chips with an acetyl content between 17% and 20% were obtained in this manner. The acetylated rubberwood chips were refined to obtain acetylated rubberwood fibers.

Example 1.2 Acetylation in the Vapour Phase at Elevated Pressure

In another test, rubberwood chips were dried in an oven at 105° C. for 16 h prior to performing a Bethel type impregnation with the acetylating agent. The acetylating agent was a mixture of 10 vol % acetic acid and 90 vol % acetic anhydride, wherein the vol % is as compared to the total volume of the acetylating agent. After the impregnation procedure, excess liquid was removed and the rubberwood chips were transferred to a reaction vessel. Air was removed and replaced by nitrogen ($N_2$) gas. The chips were acetylated at 190° C. at a pressure between 2 and 4 barg in a timeframe between 15 to 60 minutes. Afterwards, the reaction vessel and its contents were brought back to ambient conditions. A chemical recovery step was performed at a temperature between 150° C. and 200° C. in a timeframe of from 30 minutes to 60 minutes. The chips were then allowed to cool down before being analyzed. Acetylated rubberwood chips with an acetyl content between 17% and 25%, mostly between 20% and 25%, were obtained in this manner. The acetylated rubberwood chips were refined to obtain acetylated rubberwood fibers.

Example 1.3 Acetylation in the Liquid Phase at Elevated Pressure

In yet another test rubberwood chips were dried in an oven at 105° C. for 16 h. The rubberwood chips were transferred to the reaction vessel and the air was replaced by nitrogen ($N_2$) gas. Then, the chips were impregnated with the acetylating agent using the Bethel method. The acetylating agent was a mixture of 10 vol % acetic acid and 90 vol % acetic anhydride, wherein the vol % is as compared to the total volume of the acetylating agent. After the impregnation procedure, the chips were acetylated at a temperature between 150° C. and 190° C. at a pressure between 2 and 4 barg in a timeframe between 15 to 60 minutes. Afterwards, the excess liquid was removed and a chemical recovery step was performed at a temperature between 150° C. and 200° C. in a timeframe of 30 minutes to 60 minutes. The chips were then brought to ambient conditions before being analyzed. Acetylated rubberwood chips with acetyl content between 17% and 25%, mostly between 20 and 25%, were obtained in this manner.

Example 2: Preparing MDF Panels Comprising Acetylated Wood Elements Made of Rubberwood Example 2.1

The acetylated rubberwood fibers obtained in either Example 1.1 or Example 1.2 were mixed with MDI resin (6 wt %) and release wax (2 wt %) in the blow-line after the refining step. The moisture content of the rubberwood fibers was controlled between 6-8 wt %. Acetylated rubberwood MDF panels with dimensions 520×560×12 mm$^3$ were formed manually and pressed in a distance-regulated down stroke press. The pre-pressing pressure was 10 bar and the pressing temperature was 220° C. with a press factor of 10 s/mm. The density of the panels formed was 740 kg/m$^3$.

Reference MDF panels made from non-acetylated rubberwood fibers were prepared in the same way.

Example 2.2

From acetylated rubberwood fibers obtained according to Example 1.2 panels were made according to Example 2.1, with the only difference that 1 wt % of release wax was used instead of 2 wt % as mentioned in Example 2.1. Reference MDF panels made from non-acetylated rubberwood fibers were prepared in the same way as the MDF panels made from acetylated rubberwood fibers.

Example 3

Measuring the Internal Bond Strength of MDF Panels

The internal bond strength of the prepared MDF panels was tested according to the procedure as described in European Norm EN-319.

The internal bond strength for the acetylated rubberwood MDF panels as prepared by Example 2.1 was 1.92±0.2 N/mm$^2$. For the reference MDF panels made from rubberwood that had not been acetylated as prepared by Example 2.1 the internal bond strength was 1.40±0.2 N/mm$^2$.

The internal bond strength for the acetylated rubberwood MDF panels as prepared by Example 2.2 was 1.84±0.2 N/mm$^2$. For the reference MDF panels made from rubberwood that had not been acetylated as prepared by Example 2.2 the internal bond strength was 1.54±0.2 N/mm$^2$.

The invention claimed is:
1. A board comprising acetylated wood elements, wherein the acetylated wood elements are obtained from rubberwood, wherein said acetylated wood elements have an acetyl content of at least 17%, and wherein said acetylated wood elements are selected from the group consisting of fibres, chips, particles, splinters, and fibre bundles;

wherein the board has an increased internal bond strength compared to a non-acetylated reference board;

wherein fibres have a length of from 1 mm to 5 mm, a width of from 0.05 mm to 0.1 mm, and a thickness of from 0.05 mm to 0.1 mm;

chips have a length of from 5 mm to 75 mm, a width of from 5 mm to 50 mm, and a thickness of from 1.5 mm to 25 mm;

particles have a length of from 1.5 mm to 20 mm, a width of from 0.15 mm to 5 mm, and a thickness of from 0.15 mm to 5 mm;

splinters have a length of from 5 mm to 75 mm, a width of from 0.15 mm to 0.5 mm, and a thickness of from 0.15 mm to 0.5 mm; and fibre bundles have a length of from 1.5 mm to 25 mm, a width of from 0.15 mm to 5 mm, and a thickness of from 0.15 mm to 5 mm.

2. The board according to claim 1, wherein the acetylated wood elements are present in an amount of at least 50% by weight as compared to the total weight of wood elements comprised in the board.

3. The board according to claim 2, wherein the acetylated wood elements are present in an amount of at least 80% by weight as compared to the total weight of wood elements comprised in the board.

4. The board according to claim 1, wherein the acetylated wood elements have an acetyl content of at most 35%.

5. The board according to claim 1, wherein the board is selected from the group consisting of medium density fibre board, low density fibre board, high density fibreboard, particleboard, and flakeboard.

6. The board according to claim 5, wherein the board is a medium density fibre board.

7. The board according to claim 1, wherein the acetylated wood elements are fibres.

8. A method for producing a board of acetylated rubberwood elements, wherein the method comprises the subsequent steps of:

a) providing wood elements from rubberwood, wherein said wood elements are selected from the group consisting of fibres, particles, splinters, and fibre bundles; and b) contacting said wood elements with an acetylation agent to obtain acetylated rubberwood elements having an acetyl content of at least 17%; and c) forming the board from the acetylated rubberwood elements, wherein the board has an increased internal bond strength compared to a non-acetylated reference board;

wherein fibres have a length of from 1 mm to 5 mm, a width of from 0.05 mm to 0.1 mm, and a thickness of from 0.05 mm to 0.1 mm;

particles have a length of from 1.5 mm to 20 mm, a width of from 0.15 mm to 5 mm, and a thickness of from 0.15 mm to 5 mm;

splinters have a length of from 5 mm to 75 mm, a width of from 0.15 mm to 0.5 mm, and a thickness of from 0.15 mm to 0.5 mm; and fibre bundles have a length of from 1.5 mm to 25 mm, a width of from 0.15 mm to 5 mm, and a thickness of from 0.15 mm to 5 mm.

9. The method according to claim 8, wherein in step a) the wood elements are fibres.

10. The method according to claim 8, wherein in step b) the acetylation agent is in the vapour phase.

11. A method for producing a board of acetylated rubberwood elements, wherein the method comprises the subsequent steps of:

a) providing wood elements from rubberwood, wherein said wood elements are chips;

b) contacting said wood elements with an acetylation agent to obtain acetylated rubberwood elements having an acetyl content of at least 17%;

c) refining said acetylated rubberwood elements to obtain fibres; and d) forming a board from the fibres, wherein the board has an increased internal bond strength compared to a non-acetylated reference board;

wherein fibres have a length of from 1 mm to 5 mm, a width of from 0.05 mm to 0.1 mm, and a thickness of from 0.05 mm to 0.1 mm; and chips have a length of from 5 mm to 75 mm, a width of from 5 mm to 50 mm, and a thickness of from 1.5 mm to 25 mm.

12. The method according to claim 11, wherein in step b) the acetylation agent is in the vapour phase.

* * * * *